Figure 3:
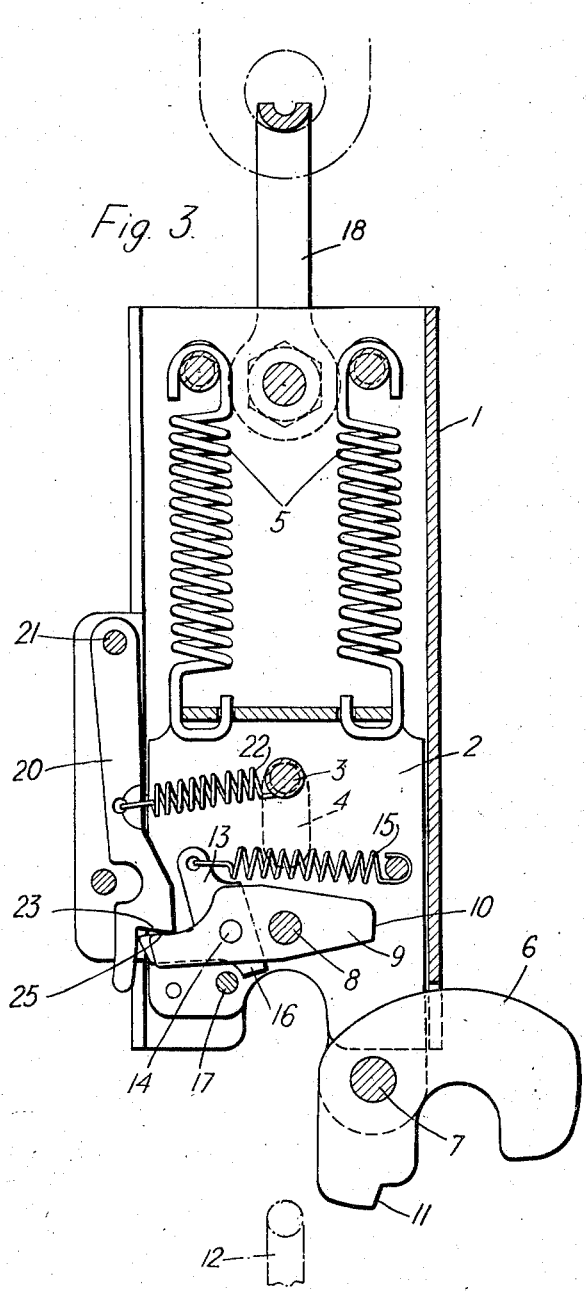

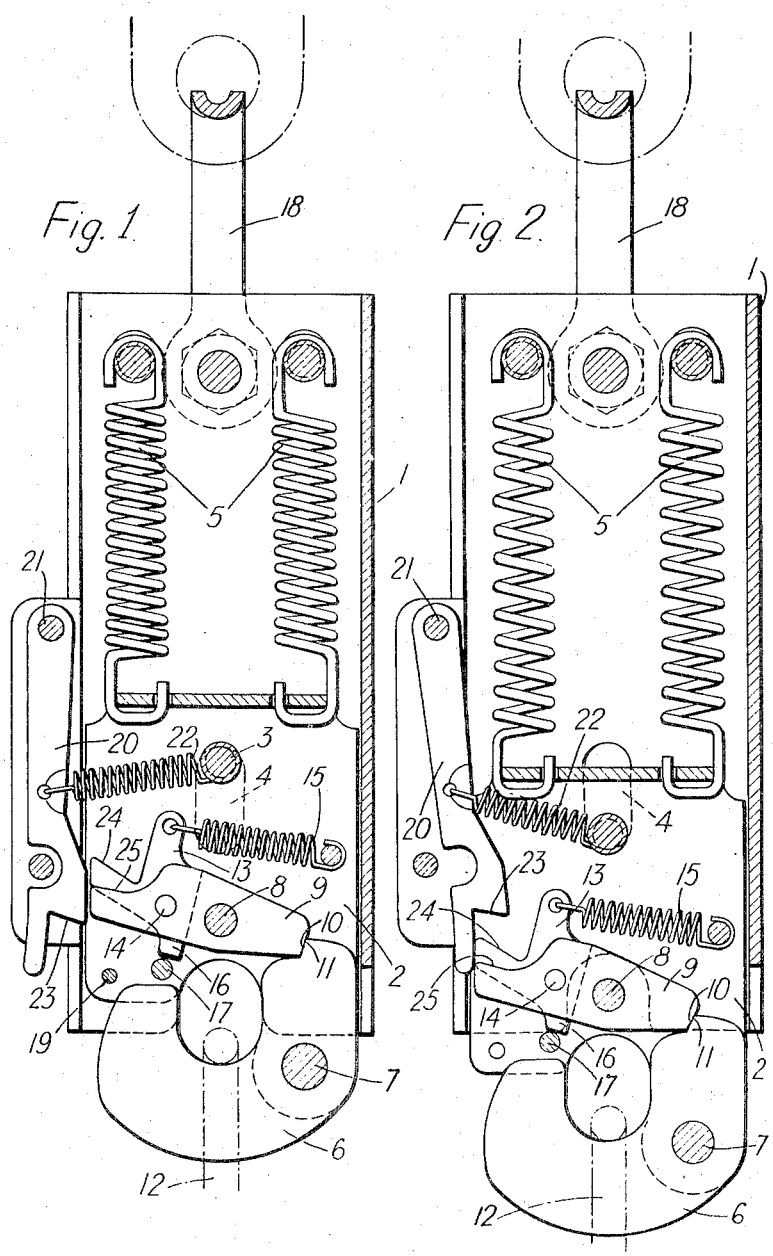

Oct. 28, 1958 W. H. SMITH 2,858,161
RELEASE DEVICES FOR TRACTION MECHANISMS
Filed Feb. 11, 1955 2 Sheets-Sheet 2

Inventor
WILLIAM H. SMITH

United States Patent Office 2,858,161
Patented Oct. 28, 1958

2,858,161

RELEASE DEVICES FOR TRACTION MECHANISMS

William Herbert Smith, East Molesey, England, assignor to Trianco Limited, East Molesey, England Application February 11, 1955, Serial No. 487,622

6 Claims. (Cl. 294—83)

This invention is directed towards the provision of improved release devices for traction mechanism whereby the mechanism becomes detached when the tractive force falls below a predetermined limit.

The present invention provides a release device for traction mechanism in which on the traction force falling below a predetermined value, a coupling is opened by the traction force to release the traction mechanism from the release device.

From another aspect, a release device according to the invention comprises a release device for traction mechanism comprising a coupling member by which the traction mechanism is attached to the release device, means to open the coupling member to release the traction mechanism, and means set by the traction force exceeding a predetermined value to operate these opening means when the traction force falls below a predetermined value.

From yet another aspect, a release device according to the invention comprises two members slidable relatively to one another against spring tension by a tractive force applied to the members, and means operated by movement of the two members in the opposite direction when the tractive force falls below a predetermined limit to allow operation of a catch to release the force applying means from one of the members.

From yet another aspect, a release device according to the invention comprises two members slidable relatively to one another to a limited extent, spring means urging the two members to one end of their limited relative movement, hook means for attachment of a cable to one of said members, catch means to retain said hook in position to retain said cable, abutment means brought into position, when said two members are slid relatively to one another by a tractive force against said spring means, ready to engage said catch means and release said hook when said two members slide relatively to one another under the action of said spring means on said tractive force falling below a predetermined value.

Other parts of the invention are embodied in the preferred form which will now be described in some detail with reference to the accompanying drawings in which Fig. 1 is a view of the device in the unloaded position.

Fig. 2 is a similar view in the position assumed when load is applied to the device and Fig. 3 is a similar view in the position assumed after the load has fallen below a predetermined value.

The device comprises a sleeve 1 within which is slidable a body 2. A pin 3 fixed in the body 2 engages a slot 4 in the sleeve so that relative movement of the body 2 in the sleeve 1 is limited by engagement of the pin 3 with the ends of the slot 4.

Springs 5, engaging at one end pins fixed to the sleeve 1 and at the other end attached to the body 2, urge the body 2 and sleeve 1 to the position shown in Fig. 1 with the pin 3 engaging one end of slot 4.

A hook 6 is pivoted to the body 1 about the pivot pin 7. Also pivoted to the body 1 about a pawl pin 8 is a pawl 9, one end 10 of which engages, in the position of Fig. 1, a shoulder 11 on the hook 6. The pawl 9 in this position prevents the hook opening under a traction force applied to a cable 12.

A safety catch 13 pivoted about the pin 14 to the pawl 9 is urged in a clockwise direction by a spring 15 so that the tail 16 abuts a pin 17. The spring 15 also urges the pawl 9 in a clockwise direction ensuring the continued engagement of the pawl with the hook.

A shackle 18 is attached to the sleeve 1 and this can be attached to a parent strong point.

A shear wire 19 passes through the body 2 and the sleeve 1.

When a traction force is applied to the cable 12 sufficient to shear the wire 19 and overcome the force of the springs 5, the body 2 moves within the sleeve 1 until the pin 3 reaches the other end of the slot 4 to the position shown in Fig. 2.

In this position, a latch 20 pivoted to the side of the sleeve 1 about the pivot 21 is drawn by a spring 22 onto the sleeve 1. In this position a shoulder 23 on the latch 20 lies behind the nose 24 of the catch 13 and behind the nose 25 of the pawl 9. The parts remain in this position so long as the traction force remain above a value determined by the springs 5.

When the traction force falls below this value, the springs 5 draws the body 2 into the sleeve 1. First the nose 24 of the catch 13 and then the nose 25 of the pawl 9 abut against the shoulder 23 on the latch 20 causing the catch 13 and pawl 9 to be turned counter clockwise, releasing the safety catch from the pin 17 and releasing the pawl 9 from the shoulder 11 on the hook 6. As a result the hook 6 is turned about its pivot by the traction force of the cable and the cable slips off the hook.

The release unit may again be connected into a similar system for further use by means of the shackle 18 and by engagement with hook 6. The hook is closed and is locked in position by manual operation of the latch 20 to move this outwardly allowing the pawl 6 and safety catch 13 to return to their original position.

It should be understood that the use of shear wire 19 is optional. It is however useful under conditions which involve substantial variations of the traction force the shear wire then isolating the device from such variations which might cause premature release.

It will be understood that the device may be connected so that its operation releases the whole device from the anchorage.

It will also be understood that the invention is not restricted to the details of the preferred form described by way of example which may be modified without departure from the broad ideas underlying them.

I claim:

1. A release device for traction mechanism comprising two members slidable relatively to one another to a limited extent, spring means urging the two members to one end of their limited relative movement, hook means for attachment of a cable pivoted to one of said members, catch means to retain said hook in position to retain said cable, abutment means brought into position, when said two members are slid relatively to one another by a tractive force against said spring means, ready to engage said catch means and release said hook when said two members slide relatively to one another under the action of said spring means on said tractive force falling below a predetermined value.

2. A traction device according to claim 1 in which the abutment means comprises a latch member pivoted to one member and spring pressed towards a position ready to engage the catch means.

3. A traction device according to claim 2 in which the catch means comprises a pivoted pawl, spring biased to a position in which one end thereof engages the hook to retain it in closed position the other end of the pawl engaging the abutment means on release of tractive force to cause the pawl to rotate and disengage the hook.

4. A traction device according to claim 3 having a safety catch pivoted to the pawl and released by engagement with the abutment means.

5. A release device for traction mechanism comprising two members slidable relatively to one another to a limited extent, spring means urging the two members to a position at one end of the limited relative movement, a hook pivoted to one of said members, a pivoted pawl adapted to engage said hook to retain said hook in a position to retain a cable, said hook on disengagement from said pawl rotating about its pivot to release said cable, spring means rotating said pawl about its pivot into a position to engage said hook, abutment means pivoted to the other of said members, spring means drawing said abutment means inwardly of said member, said pawl engaging said abutment means when said members are in position at the one end of their relative movement to prevent such inward movement, said abutment means being moved inwardly on movement of said members from this position to a position ready to engage said pawl and rotate it to release the hook when said members are returned to the said position.

6. A release device for traction mechanism comprising two members slidable relatively to one another to a limited extent, spring means urging the two members to a position at one end of their limited relative movement, a hook pivoted to one of said members, a pivoted pawl adapted to engage said hook to retain said hook in a position to retain a cable, said hook on disengagement from said pawl rotating about its pivot to release said cable, a catch pivoted to said pawl, a stop engaged by said catch to prevent rotation of said pawl to release said hook, spring means maintaining said catch against said stop, and rotating said pawl about its pivot into a position to engage said hook, abutment means pivoted to the other of said members, spring means drawing said abutment means inwardly of said members, said pawl engaging said abutment means when said members are in position at the one end of their relative movement to prevent such inward movement, said abutment means being moved inwardly on movement of said members from this position to a position to engage said catch and release it from said stop and then to engage said pawl and rotate it to release the hook when said members are returned to the said position.

References Cited in the file of this patent

UNITED STATES PATENTS

| | | |
|---|---|---|
| 2,131,445 | Lawton | Sept. 27, 1938 |
| 2,410,816 | Frieder et al. | Nov. 12, 1946 |
| 2,435,649 | Gray | Feb. 10, 1948 |
| 2,490,558 | Sullivan | Dec. 6, 1949 |
| 2,625,423 | Hight | Jan. 13, 1953 |